United States Patent
Basham et al.

(10) Patent No.: US 8,037,156 B2
(45) Date of Patent: Oct. 11, 2011

(54) HOST DISCOVERY IN MULTI-BLADE SERVER CHASSIS

(75) Inventors: Robert Beverley Basham, Aloha, OR (US); Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/206,444

(22) Filed: Sep. 8, 2008

(65) Prior Publication Data
US 2010/0064023 A1    Mar. 11, 2010

(51) Int. Cl.
G06F 15/16    (2006.01)

(52) U.S. Cl. ...................................... 709/217

(58) Field of Classification Search .......... 709/217–219
See application file for complete search history.

(56) References Cited

U.S. PATENT DOCUMENTS

| | | | |
|---|---|---|---|
| 6,988,130 B2 | 1/2006 | Blumenau et al. | |
| 7,272,661 B2 | 9/2007 | Sato | |
| 7,478,177 B2 * | 1/2009 | Cherian et al. | 710/9 |
| 7,502,902 B2 * | 3/2009 | Sato et al. | 711/161 |
| 7,519,625 B2 * | 4/2009 | Honami et al. | 1/1 |
| 7,590,648 B2 * | 9/2009 | Shankar et al. | 1/1 |
| 7,617,333 B2 * | 11/2009 | Pettey | 710/5 |
| 7,664,945 B2 * | 2/2010 | Ueno et al. | 713/2 |
| 7,716,309 B2 * | 5/2010 | Benhase et al. | 709/220 |
| 7,783,737 B2 * | 8/2010 | Fujino et al. | 709/223 |
| 7,783,788 B1 * | 8/2010 | Quinn et al. | 710/8 |
| 2003/0088658 A1 | 5/2003 | Davies et al. | |
| 2004/0059901 A1 | 3/2004 | Miller et al. | |
| 2005/0050191 A1 * | 3/2005 | Hubis | 709/223 |
| 2006/0143305 A1 | 6/2006 | Mason et al. | |
| 2006/0174000 A1 | 8/2006 | Graves | |
| 2008/0104243 A1 * | 5/2008 | Roscoe et al. | 709/226 |
| 2008/0114961 A1 | 5/2008 | Ramaswamy et al. | |

OTHER PUBLICATIONS

"Automatic mapping of worldwide names to physical locations using fault indicators" IBM; IP.com No. IPCOM000019896D; Original Publication Date: Oct. 8, 2003, 4 pages.

"Shared disk I/O cache" IBM; IP.com No. IPCOM000021651D; Original Publication Date: Jan. 29, 2004, 7 pages.

* cited by examiner

Primary Examiner — Hussein Elchanti
(74) Attorney, Agent, or Firm — Griffiths & Seaton PLLC

(57) ABSTRACT

A method for discovering hosts on a multi-blade server chassis is provided. A switch, operational in the multi-blade server, is queried for first world-wide name (WWN) information of the hosts. The first WWN information is known to the switch. The first WWN information is saved on a redundant array of independent disks (RAID) subsystem of the multi-blade server chassis. A system location for each of the hosts is mapped to the RAID subsystem.

18 Claims, 4 Drawing Sheets

HOST DISCOVERY IN MULTI-BLADE SERVER CHASSIS

BACKGROUND OF THE INVENTION

1. Technical Field

The present invention relates in general to computers, and more particularly to a method, system, and computer program product for discovering hosts in a multi-blade server chassis.

2. Description of Related Art

Multiple blade servers are computers that consolidate high-density server boards (blades) in a single blade chassis (server blade chassis). Typically, a blade chassis accommodates multiple hot-swappable blades.

Server blades are widely used in datacenters to save space and improve system management. Either self-standing or rack mounted, the blade chassis provides the power supply. Each blade may have its own central processing unit (CPU), memory, and hard disk. Server blades generally provide their own management systems and may include a network or storage switch.

Most computer systems require storage and a means of accessing the storage. Storage may be accessed by means of redundant array of independent disks (RAID) controllers, either singular or redundant. The RAID controllers in turn provide connectivity to the fundamental storage, such as hard disk drives.

SUMMARY OF THE INVENTION

A server blade chassis may include various components, such as the aforementioned switch, RAID subsystem (including the RAID controllers), and individual server blades. Each of these components reside in a physical location, and are dependent upon each other. One goal of an end user is to configure the server blades to have access to storage in the RAID subsystem. To achieve this goal, the end user may have to manually determine a variety of information. For example, to enable the mapping of server blade hosts to RAID logical unit numbers (LUNs), a user may need to manually determine world-wide name (WWN) information on server blade ports in the chassis in order to define the hosts to the RAID subsystem.

Such manual determination may be a tedious or non-obvious process to an end user, particularly if the end user is marginally knowledgeable in storage management. In addition, when a host adapter fails, the replacement adapter must be defined to the RAID subsystem, and LUN mappings must be transferred from the old adapter port to the replacement adapter port. If the replacement adapter information is defined and mapped manually, the potential for mistakes and loss of access to data is heightened.

In light of the foregoing, a need exists for a mechanism to simplify and automate the manual blade host definitional process described above for an end user. Accordingly, in one embodiment, by way of example only, a method for discovering hosts on a multi-blade server chassis is provided. A switch, operational in the multi-blade server, is queried for first world-wide name (WWN) information of the hosts. The first WWN information is known to the switch. The first WWN information is saved on a redundant array of independent disks (RAID) subsystem of the multi-blade server chassis. A system location for each of the hosts is mapped to the RAID subsystem.

In another embodiment, again by way of example only, a system for discovering hosts on a multi-blade server chassis is provided. A processor device is in communication with a memory device. The processor device is operational on the multi-blade server chassis. The processor device is adapted for querying a switch operational in the multi-blade server for first world-wide name (WWN) information of the hosts, wherein the first WWN information is known to the switch, saving the first WWN information on a redundant array of independent disks (RAID) subsystem of the multi-blade server chassis, and mapping a system location for each of the hosts to the RAID subsystem.

In still another embodiment, again by way of example only, a computer program product is provided for discovering hosts on a multi-blade server chassis is provided. The computer program product comprises a computer-readable storage medium having computer-readable program code portions stored therein. The computer-readable program code portions comprise a first executable portion for querying a switch operational in the multi-blade server for first world-wide name (WWN) information of the hosts, wherein the first WWN information is known to the switch, a second executable portion for saving the first WWN information on a redundant array of independent disks (RAID) subsystem of the multi-blade server chassis, and a third executable portion for mapping a system location for each of the hosts to the RAID subsystem.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for simplifying and automating the discovery and definitional process of hosts in a multi-blade server chassis. The illustrated embodiments leverage a common layer with access to each of the chassis components to obtain necessary information. In one embodiment, this common layer may be a storage configuration manager (SCM). The functionality of an SCM will be described in further detail, following. Using the common layer, components having host information may be queried. The information may then be passed through the common layer as an intermediary to components not having the host information.

Figure 1:
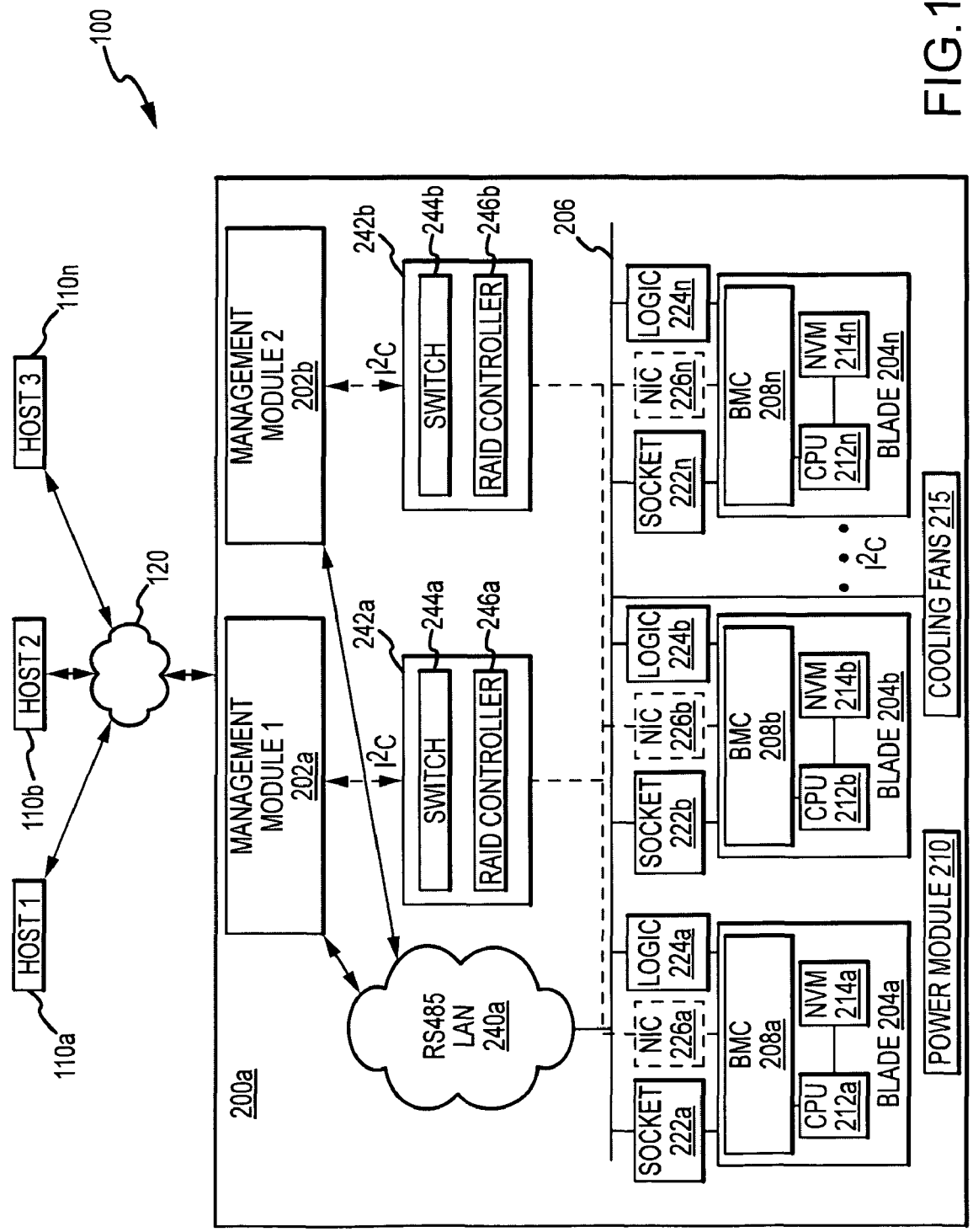
FIG. 1 is an exemplary multi-blade server chassis in which various aspects of the following description and claimed subject matter may be implemented.

FIG. 1 is an exemplary block diagram of a computing environment 100 having several hosts with access to a multi-blade server chassis. For the sake of clarity, three hosts 110a, b,n are depicted. However, additional hosts may be associated with the chassis as one skilled in the art will appreciate. Hosts 110a,b,n are connected through a network fabric 120 to a multi-blade server blade chassis 200a. Again, for the sake of clarity, only three server blades 204a,b,n are depicted. However, in one embodiment, server blade chassis 200a has a midplane 206 capable of connecting fourteen or more server blades 204.

Server blade chassis 200a has one or more management modules 202. In the depicted embodiment, server blade chassis 200a has a primary management module 202a and a back-up management module 202b. Each management module 202 is capable of managing multiple server blades 204. During normal operations, one of the local management modules 202a or 202b are coupled to server blades 204a-n via a Local Area Network (LAN) 240a, a midplane 206, and a plurality of Baseboard Management Controllers (BMCs) 208 (each server blade 204 having a BMC 208) to form an in-band management pathway. LAN 240 and BMC 208 are discussed in further detail below.

Midplane 206 is a backplane, mounted in the middle of server blade chassis 200a, that contains circuitry and sockets 222 into which additional electronic devices or cards, including server blades 204 may be inserted. Midplane 206 contains at least one bus for secure in-band internal communication between management module 202 and server blades 204a-n, as well as between and among server blades 204a-n themselves, via respective BMCs 208a-n.

When a server blade 204 is inserted into a specific socket 222, a physical address is established for that server blade 204. For example, consider server blade 204a being inserted into socket 222a. A control logic 224a detects the presence of server blade 204a in socket 222a. Logic 224a may comport with the Electronics Industry Association (EIA) RS485 Standard for data communication. In other embodiments, Logic 224a may be compliant with the Phillips' Inter-IC (Inter-Integrated Circuit) standard (incorporated by reference in its entirety herein and commonly referred to as "I$^2$C"), or with an Ethernet network standard. Logic 224a, operating in conjunction with management module 202, assigns a physical address on a bus in midplane 206 to server blade 204a when server blade 204a is inserted into socket 222a. Each server blade 204 may be associated with a unique logic 224 that is connected to midplane 206 as depicted in FIG. 2a. Alternatively, all server blades 204 may use a single logic 224.

Each server blade 204 may have a unique Internet Protocol (IP) address on midplane 206. That is, midplane 206 may support intercommunication using IP addressing protocol, in which each device connected or coupled to midplane 206 contains an IP address assigned by logic (not shown) that is either within or outside server blade chassis 200. For example, a Dynamic Host Configuration Protocol (DHCP) server may be used to assign an IP address to server blade 204a. Communication with server blade 204a is thereafter via a Network Interface Card (NIC) 226a that is associated with server blade 204a.

In accordance with the illustrated embodiment, an integrated RAID/Switch module 242a is connected to NIC 226a. Module 242a may be used in pairs (e.g., module 242b) to provide redundancy. RAID/Switch module 242a includes an integrated switch module 244a, such as a serial attached SCSI (SAS) switch module. Switch modules 242a, 242b provide connectivity to Ethernet or SAS, for example. RAID controllers 246a and 246b are incorporated into the integrated RAID/Switch modules 242a and 242b. The RAID controllers 246a, 246b do not take up a blade slot. RAID controller 246a is interconnected to RAID devices, such as storage devices in a RAID configuration. The RAID devices located within one or more blades 204. The RAID controllers 246a, 246b and attached RAID devices may collectively be thought of as a RAID subsystem of the server blade chassis.

Each server blade 204 may have at least one central processing unit (CPU) 212, and a non-volatile memory (NVM) 214. NVM 214 is a Flash Read Only Memory ("Flash ROM" or "Flash Memory") that can be erased and reprogrammed in units of memory referred to as "blocks." NVM 214 may also include non-volatile Electrically Erasable Programmable Read Only Memory (EEPROM) that is similar to Flash Memory, except that EEPROM is erased and rewritten at the byte level and is usually smaller in capacity. The server blade 204 may be oriented as a storage blade (with a number of integrated storage devices such as disk drives) or a processor blade (with one or more processing devices) for performing computing processing.

When a server blade 204 is shipped from a manufacturer, the NVM 214 may be pre-burned with firmware, including a BIOS as well as software for monitoring the server blade 204. Such monitoring may include controlling Direct Access Storage Devices (DASD's), monitoring and controlling voltages throughout the system, determining the power-on status of the server blade 204, requesting access to a shared keyboard, video, mouse, Compact Disk-Read Only Memory (CD-ROM) and/or floppy disk drives, as well as monitoring the Operating System (OS) running on the server blade 204.

Management modules 202 are capable of detecting the presence, quantity, type and revision level of each server blade 204, power module 210, and midplane 206 in the system. Management modules 202 may also directly control the operation of each server blade 204 and the power module 210, and may directly (without using the BIOS in the server blades 204) or indirectly (using the BIOS) control the operation of cooling fans 215 and other chassis 200a components.

Each server blade 204 has a Baseboard Management Controller (BMC) 208 that provides local supervisory control of the server blade 204 to which the BMC 208 is associated. Each BMC 208 is able to communicate with a local management module 202 by either using communication path 240a (in-band network) or alternatively by using switches 242a and NICs 226 (out-of-band network). The local management modules 202a, 202b may utilize a variety of communications paths 240a, such as an RS485 path 240a, a LAN path 240a and an I$^2$C path 240a to communicate with each blade 204.

LAN 240 is an in-band network also comporting with the Electronics Industry Association (EIA) RS485 Standard for data communication. Management modules 202 (either primary management module 202a or back-up management module 202b if management module 202a is down) communicate via LAN 240 with BMC 208, which includes logic for coordinating communication with server blades 204 via sockets 222.

LAN 240a may be configured to allow communications between server blades 204a-n and the management modules 202a, 202b relating to the remote BIOS settings and BIOS management. The blades 204a-n may leverage BMCs 208a-n as proxies to communicate with the management modules 202a, 202b through the RS485 protocol. Similarly, the management modules may leverage BMCs 208a-n as proxies to communicate with the blades 204a-n through the RS485 protocol. In an alternative embodiment, an RS485 connection may be separately made between each blade 204a-n and the management modules 202a, 202b. Additionally, other communications protocols and paths may be utilized, such as the aforementioned I$^2$C channel or the aforementioned TCP/IP and/or Ethernet channel over switches 244.

In order to create host mappings-to-volumes in a RAID subsystem, the RAID subsystem must know the WWN information of blade servers that are attached to switches 244a, 244b in the chassis 200a. A storage configuration manager (SCM) may be implemented as a common layer between components in the chassis 200a. For example, in one embodiment, the SCM may be operational as software, firmware, hardware, or a combination thereof operable on a particular blade 204. In this way, CPU 212 and NVM 214 may be utilized to execute and store processing instructions relating to the operation of the SCM. In additional embodiments, SCM may be implemented in the switches 244 themselves. The skilled artisan will appreciate that a variety of implementations of SCM, either in or associated with, the chassis 200a is contemplated.

The SCM may be configured to maintain a relationship between the RAID subsystem (including RAID controller 246) and switches 244. As a result, the SCM may be adapted to determine information such as WWN information from the switches 244 and provide the information as an intermediary to other chassis 200a components, such as the RAID subsystem (including RAID controller 246).

The SCM may be adapted to compare WWN information known to the switch with WWN information known to the RAID subsystem. Based on this analysis, the SCM may automatically group and add new host WWNs, determine missing RAID subsystem hosts, and provide a means for user confirmed host replacement, in which the SCM automatically defines the new host to the RAID subsystem, copies the host-to-logical unit number (LUN) mappings, and deletes the old host.

Figure 2:
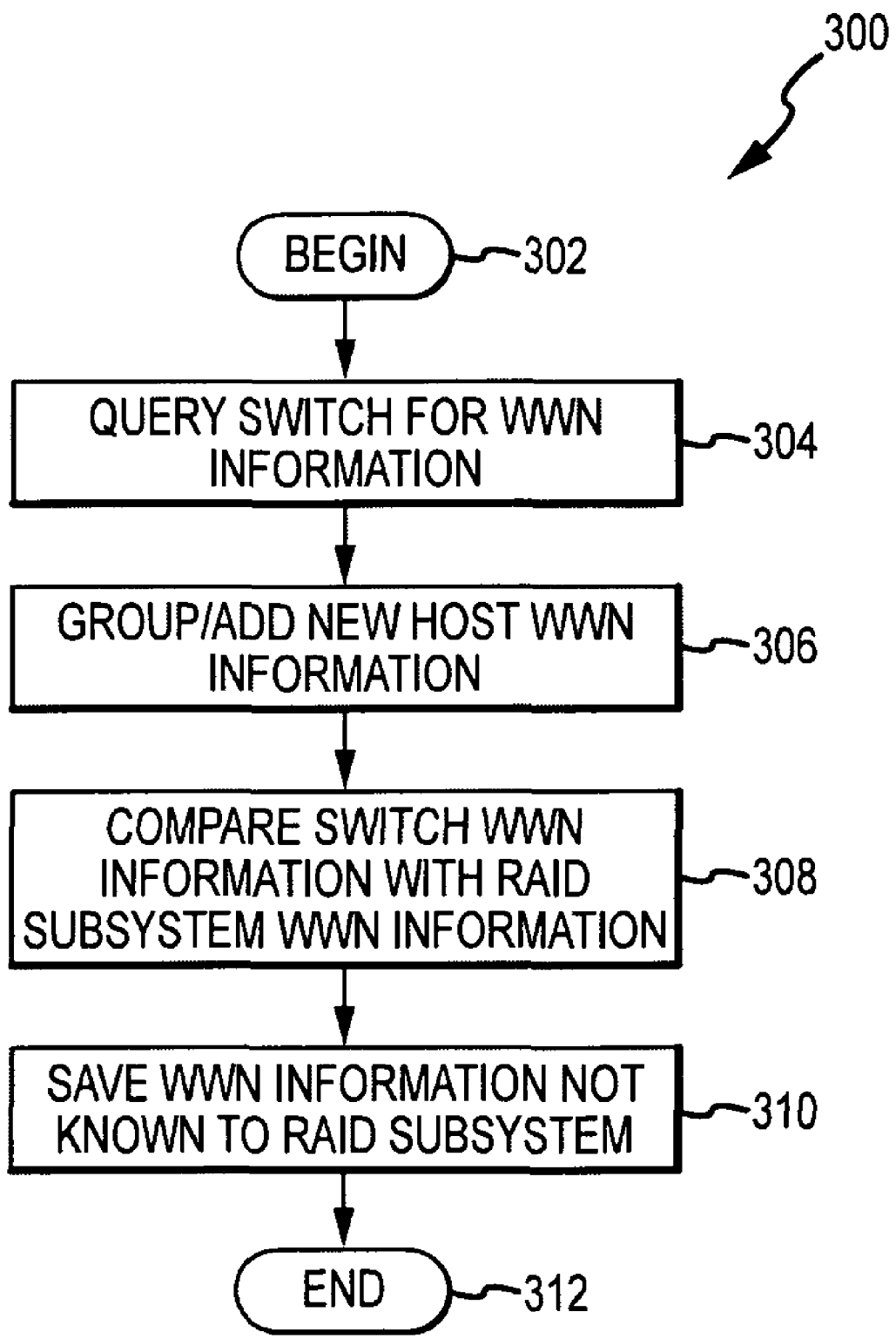
FIG. 2 is a flow chart diagram of an exemplary method for discovering hosts in a multi-blade server chassis.
Figure 3:
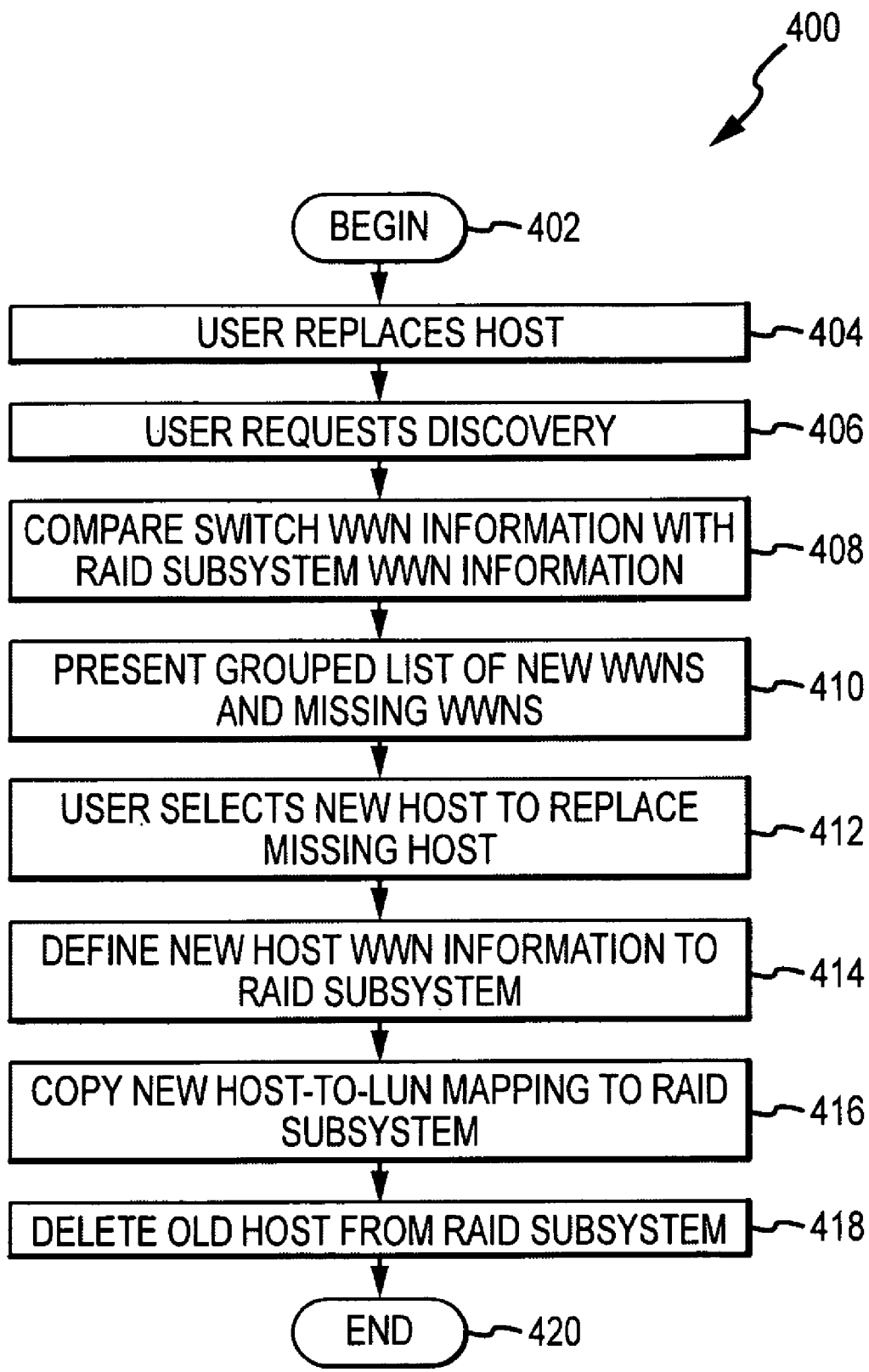
FIG. 3 is a flow chart diagram of an exemplary method for facilitating and confirming a hardware change in the multi-blade server chassis, the hardware change initiated and confirmed by a user.
Figure 4:
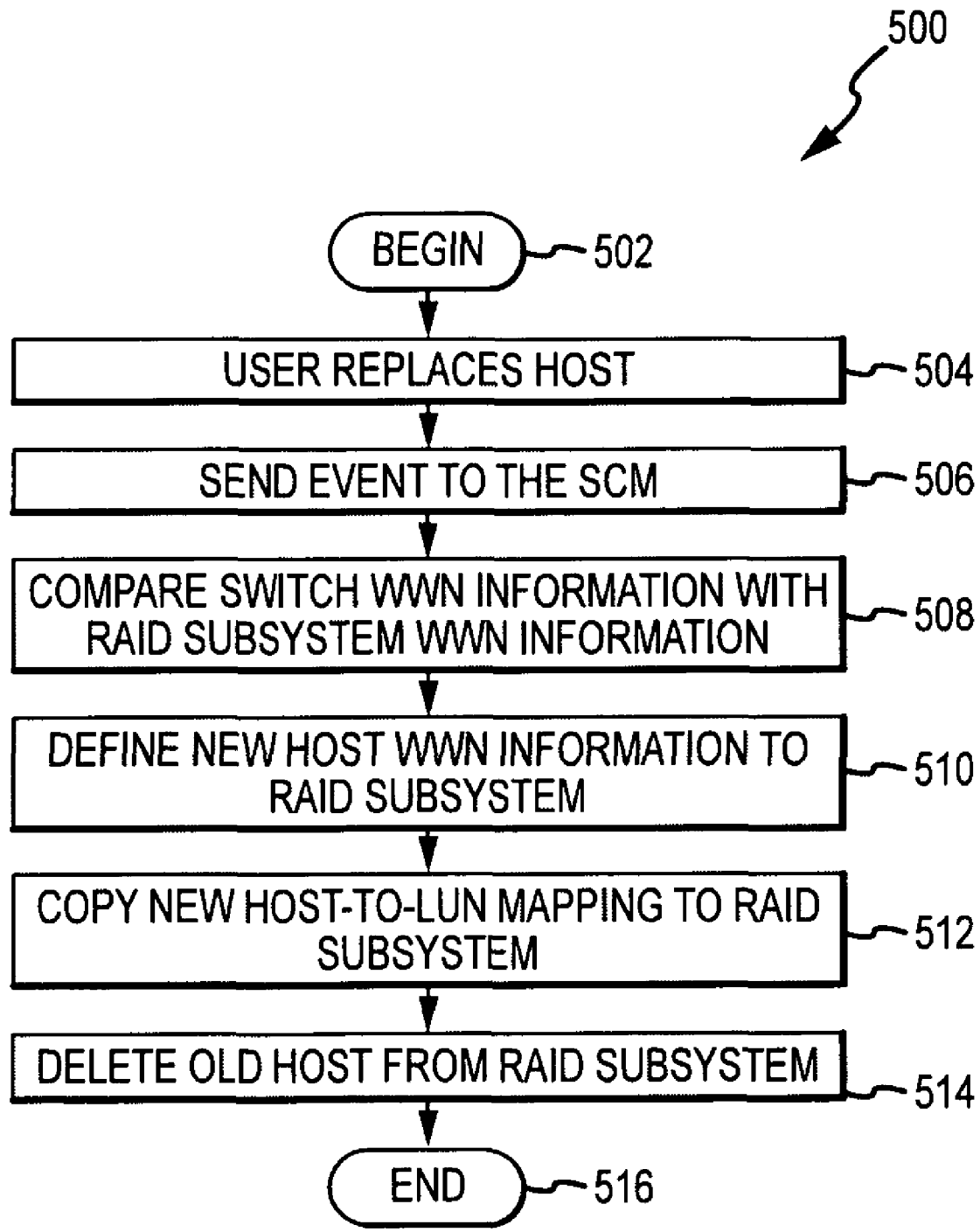
FIG. 4 is a flow chart diagram of an exemplary automated method for facilitating and confirming an event triggered hardware change in the multi-blade server chassis.

FIGS. 2-4, following, are flow chart diagrams of exemplary methods for discovering hosts in a multi-blade server chassis, and confirming a hardware change (such as host replacement) in a multi-blade server chassis, respectively. As one skilled in the art will appreciate, various steps in the method may be implemented in differing ways to suit a particular application. In addition, the described method may be implemented by various means, such as hardware, software, firmware, or a combination thereof operational on or otherwise associated with the blade server environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 2, an exemplary method 300 for discovering hosts in a multi-blade server chassis is shown. Method 300 begins (step 302) with a query to a switch for attached port information (step 304). The information obtained includes the system location (such as a slot number) of the attached port, and the WWN. The system information is used to group the redundant WWNs by system (such as a specific server (step 306). The WWN information known to the switch is compared with WWN information known to the RAID subsystem (step 308). The WWN information not known to the RAID subsystem is saved on the RAID subsystem (step 310). The method 300 then ends (step 312).

FIGS. 3 and 4, following, illustrate exemplary methods 400 and 500 for facilitating and confirming a host replacement in the multi-blade server chassis to a user. FIG. 3 describes an exemplary method where a user initiates and confirms the host replacement. FIG. 4 describes an automated approach, where an event triggers the discovery and confirmation of the hardware change. While the presented embodiments describe fully automated and user-based approaches, the skilled artisan will appreciate that in other embodiments a user-initiated approach may be combined with an automated confirmation methodology and vice-versa.

Turning to FIG. 3, method 400 begins (step 402) with the replacement of an associated host by the user (such as by swapping out a blade server) (step 404). The user then initiates the discovery of the new hardware by requesting the discovery (step 406). The system then compares attached port information between the switch and the RAID subsystem, such as switch WWN information with RAID subsystem WWN information (step 408). A grouped list of new WWNs and missing WWNs are determined and presented to the user (step 410).

Control then moves to step 412, where the user selects a new host to replace the missing host (step 412). The new, replaced host is defined to the RAID subsystem, including new host WWN information (step 414). New host-to-LUN mapping(s) are copied to the RAID subsystem (step 416). The old host is then deleted from the RAID subsystem (step 418). Method 400 then ends (step 420).

For automated event-driven methods, whenever the switch detects a change to one of the attached ports, the switch may send an event to the SCM indicating the affected port (system location), the previous port WWN information, if any, and the current port WWN information, if any. The SCM then compares the WWN information from the switch with the WWN information known to the RAID subsystem. Based on this analysis, the SCM may automatically determine and group new host WWNs, determine corresponding missing RAID subsystem hosts, define the new host to the RAID subsystem, copy the host-to-LUN mappings, and delete the old host.

Turning to FIG. 4, an exemplary automated event-initiated method 500 begins (step 502) with the replacement of a host (step 504). An event notification of such replacement is automatically sent to the SCM (Step 506). The SCM then compares the WWN information from the switch with the WWN information known to the RAID subsystem (step 508). Based on this analysis, the SCM automatically determines and groups new host WWN information, determine corresponding missing RAID subsystem hosts, and define the new host information to the RAID subsystem (step 510).

Control then moves to step 512, where the new host-to-LUN mappings are copied to the RAID subsystem. The old host is then deleted from the RAID subsystem (step 514). The method 500 then ends (step 516).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for discovering hosts on a multi-blade server chassis, comprising:
    querying a switch operational in the multi-blade server for first world-wide name (WWN) information of the hosts, wherein the first WWN information is known to the switch;
    comparing the first WWN information known to the switch with second WWN information known to the RAID subsystem;
    saving the first WWN information on a redundant array of independent disks (RAID) subsystem of the multi-blade server chassis, including saving third WWN information known to the switch but not known to the RAID subsystem to the RAID subsystem; and
    mapping a system location for each of the hosts to the RAID subsystem.

2. The method of claim 1, further including subsequent to comparing the first WWN information with the second WWN information, grouping a plurality of redundant WWN information.

3. The method of claim 1, further including subsequent to comparing the first WWN information with the second WWN information, determining a missing RAID subsystem host.

4. The method of claim 1, wherein mapping a system location for each of the hosts to the RAID subsystem includes mapping each of the hosts to RAID logical unit numbers (LUNs).

5. The method of claim 1, further including confirming a host replacement, including:
    defining new host WWN information to the RAID subsystem,
    copying a new host-to-LUN mapping to the RAID subsystem, and
    deleting an old host from the RAID subsystem.

6. The method of claim 1, further including querying the switch operational in the multi-blade server for a system location of the hosts, wherein the system location includes at least one of a port address and a port slot number.

7. A system for discovering hosts on a multi-blade server chassis, comprising:
    a processor device in communication with a memory device, the processor device operational on the multi-blade server chassis, wherein the processor device is adapted for:
        querying a switch operational in the multi-blade server for first world-wide name (WWN) information of the hosts, wherein the first WWN information is known to the switch,
        comparing the first WWN information known to the switch with second WWN information known to the RAID subsystem,
        saving the first WWN information on a redundant array of independent disks (RAID) subsystem of the multi-blade server chassis, including saving third WWN information known to the switch but not known to the RAID subsystem to the RAID subsystem, and
        mapping a system location for each of the hosts to the RAID subsystem.

8. The system of claim 7, wherein the processor device is further adapted for, subsequent to comparing the first WWN information with the second WWN information, grouping a plurality of redundant WWN information.

9. The system of claim 7, wherein the processor device is further adapted for, subsequent to comparing the first WWN information with the second WWN information, determining a missing RAID subsystem host.

10. The system of claim 7, wherein the processor device is further adapted for mapping each of the hosts to RAID logical unit numbers (LUNs).

11. The system of claim 7, wherein the processor device is further adapted for confirming a host replacement, including:
    defining new host WWN information to the RAID subsystem,
    copying a new host-to-LUN mapping to the RAID subsystem, and
    deleting an old host from the RAID subsystem.

12. The system of claim 7, wherein the processor device is further adapted for querying the switch operational in the multi-blade server for a system location of the hosts, wherein the system location includes at least one of a port address and a port slot number.

13. A computer program product for discovering hosts on a multi-blade server chassis, the computer program product comprising a non-transitory computer-readable storage medium having computer-readable program code portions stored therein, the computer-readable program code portions comprising:
    a first executable portion for querying a switch operational in the multi-blade server for first world-wide name (WWN) information of the hosts, wherein the first WWN information is known to the switch;
    a second executable portion for comparing the first WWN information known to the switch with second WWN information known to the RAID subsystem;
    a third executable portion for saving the first WWN information on a redundant array of independent disks (RAID) subsystem of the multi-blade server chassis, including saving third WWN information known to the switch but not known to the RAID subsystem to the RAID subsystem; and
    a fourth executable portion for mapping a system location for each of the hosts to the RAID subsystem.

14. The computer program product of claim 13, further including a fifth executable portion for, subsequent to comparing the first WWN information with the second WWN information, grouping a plurality of redundant WWN information.

15. The computer program product of claim 13, further including a fifth executable portion for, subsequent to comparing the first WWN information with the second WWN information, determining a missing RAID subsystem host.

16. The computer program product of claim 13, wherein the fourth executable portion for mapping a system location for each of the hosts to the RAID subsystem includes a fourth fifth executable portion for mapping each of the hosts to RAID logical unit numbers (LUNs).

17. The computer program product of claim 13, further including a fifth executable portion for confirming a host replacement, including:
  defining new host WWN information to the RAID subsystem,
  copying a new host-to-LUN mapping to the RAID subsystem, and
  deleting an old host from the RAID subsystem.

18. The computer program product of claim 13, further including a fifth executable portion for querying the switch operational in the multi-blade server for a system location of the hosts, wherein the system location includes at least one of a port address and a port slot number.

* * * * *